United States Patent [19]
King

[11] 3,731,087
[45] May 1, 1973

[54] HOT BOX ALARM SYSTEM

[75] Inventor: Joseph W. King, Lakewood, Ohio

[73] Assignee: Cleveland Technical Center, Inc., Cleveland, Ohio

[22] Filed: Nov. 16, 1970

[21] Appl. No.: 89,910

[52] U.S. Cl. ............................................246/169D
[51] Int. Cl. ................................................B61l 3/10
[58] Field of Search..................246/169 D; 340/248; 328/147, 148; 179/100.1 VC

[56] References Cited

UNITED STATES PATENTS

| | | | |
|---|---|---|---|
| 3,132,213 | 5/1964 | Taylor et al.................179/100.1 VC |
| 3,629,572 | 12/1971 | Gallagher..........................246/169 D |
| 3,100,097 | 8/1963 | Woltersdorf......................246/169 D |
| 3,593,162 | 7/1971 | Patmore...........................328/147 X |
| 3,183,349 | 5/1965 | Barnes et al......................246/169 D |

*Primary Examiner*—Gerald M. Forlenza
*Assistant Examiner*—George H. Libman
*Attorney*—Bosworth, Sessions, Herrstrom & Cain

[57] ABSTRACT

Method and apparatus for evaluating temperature indicating signals from a railway hot box detector and producing an alarm signal therefrom. The signals are differentially evaluated and are compared to appropriate reference signals to detect overheated solid or roller bearings. False alarm signals produced from the differential evaluation because of the difficulty in distinguishing the temperatures of normally operating roller bearings from those of overheated solid bearings are detected and cancelled. False alarm signals caused by noise and by time displacement between temperature indicating signals are cancelled by checking the duration of all alarm signals and passing only those that have long enough durations not to have been produced by noise or by differential evaluation of time displaced temperature indicating signals. The alarm system is advantageously connected in circuit with a chart recorder to produce a permanent record of hot boxes.

22 Claims, 5 Drawing Figures

Patented May 1, 1973
3,731,087
3 Sheets-Sheet 1
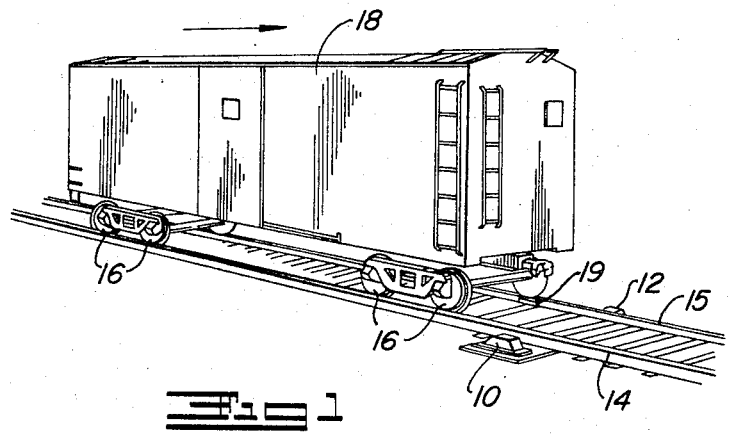
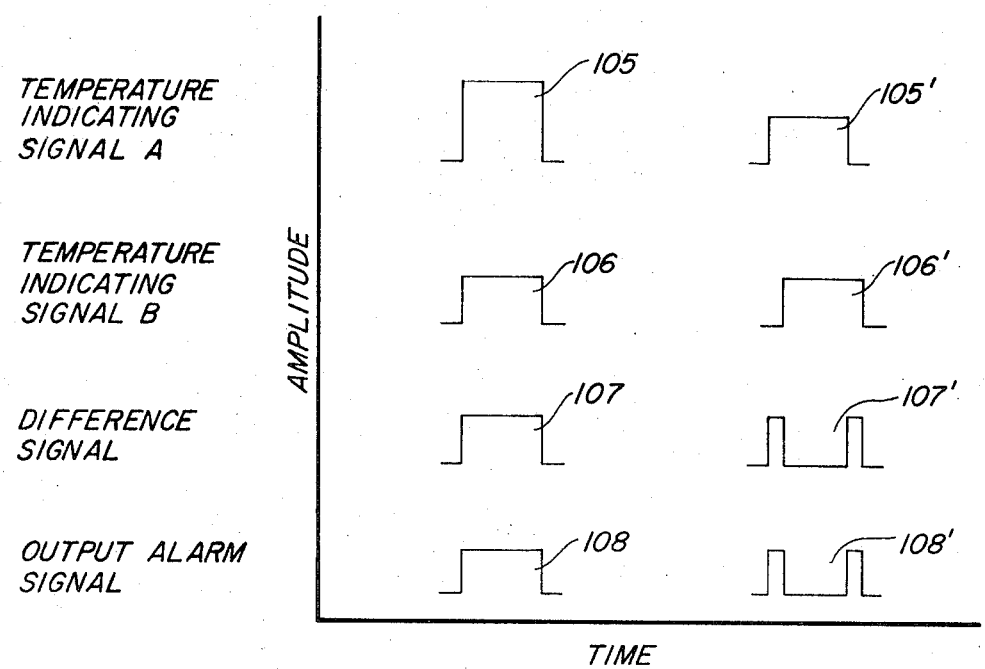
INVENTOR.
JOSEPH W. KING
BY *Bosworth, Sessions Herrstrom & Cain*
ATTORNEYS

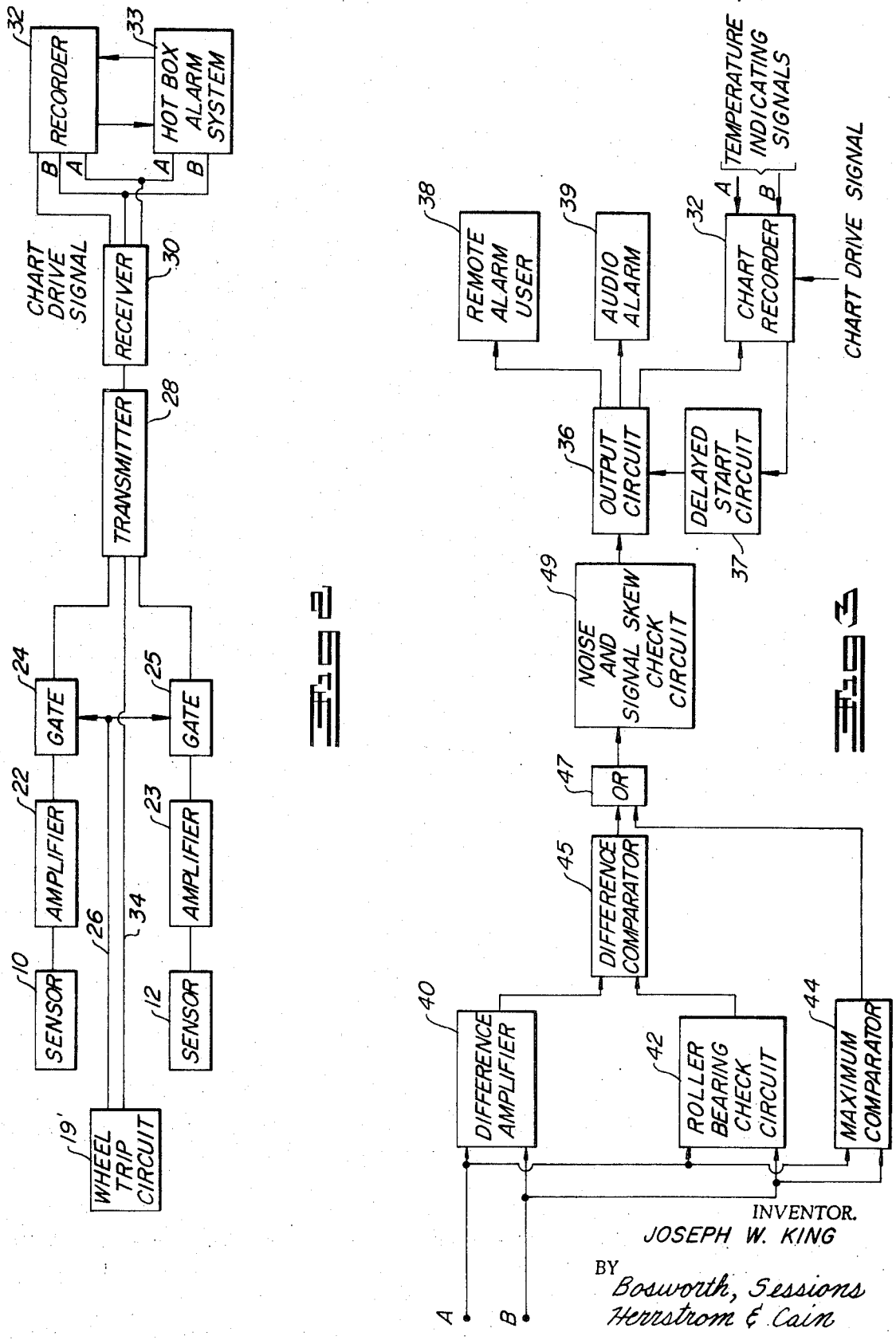

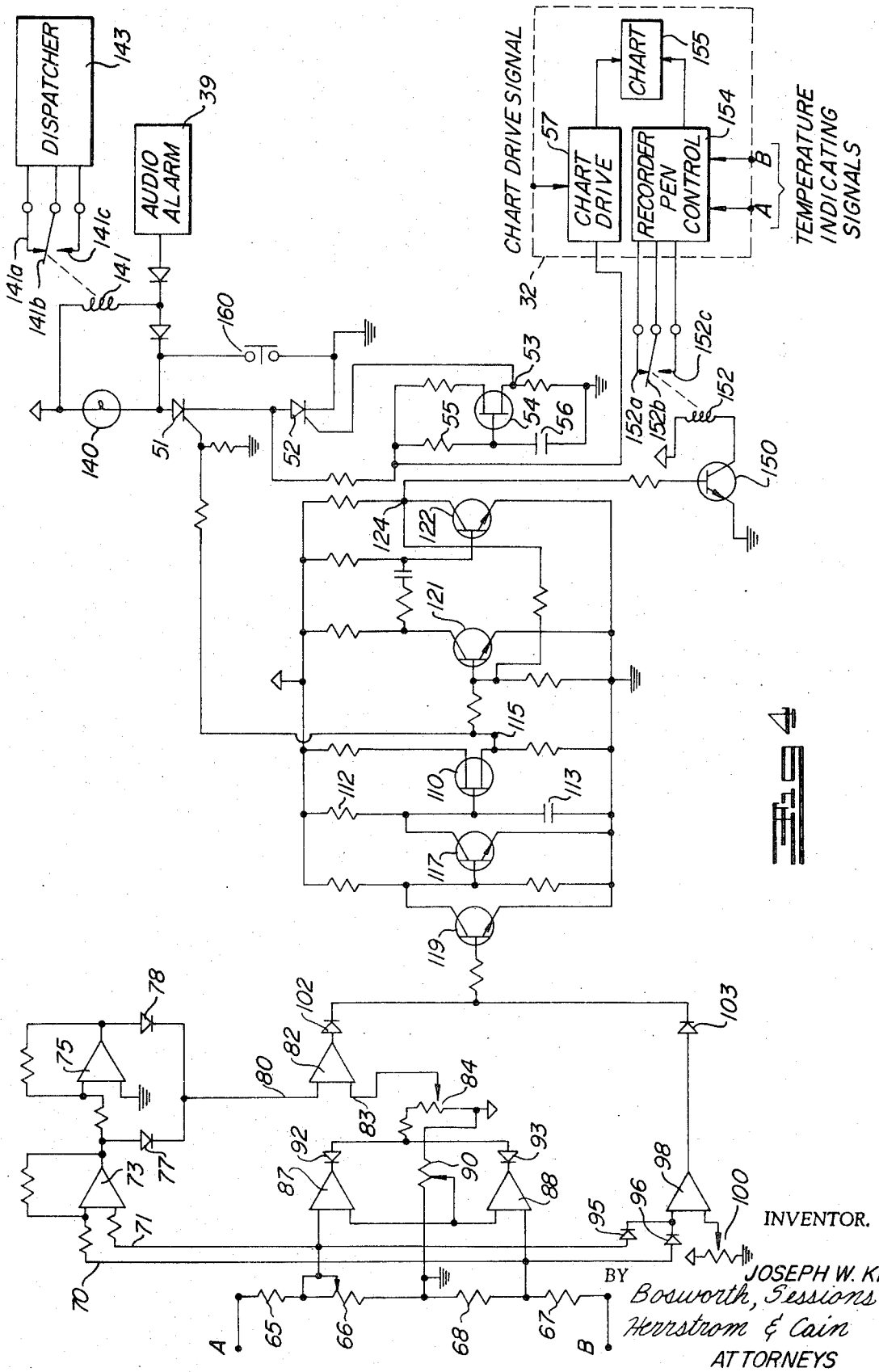

HOT BOX ALARM SYSTEM

BACKGROUND OF THE INVENTION

This invention relates to railway hot box detectors and more particularly to an improved alarm system for such detectors.

Hot box detectors are normally installed alongside a railroad track and automatically respond to heat radiated from passing railroad car journals to yield an indication of the passage of an overheated journal. Heat responsive cells are usually placed on opposite sides of the track and are used to separately evaluate the thermal conditions of passing journal boxes at the opposite ends of rolling-stock axles. The detectors produce signals indicative of the temperatures of a scanned journal box and of a reference object, which may be the journal box at the opposite end of the same axle. The temperature indicating signals generated by the detectors are generally transmitted to a graphic recorder and also to an alarm system to produce an audible or visual alarm if the temperatures indicated are out of limits.

A particular disadvantage of prior alarm systems used with hot box detectors is their tendency to produce false alarms. Of course, considering the possible consequences of an overheated journal the alarm systems must be designed to err on the side of safety. Nevertheless, an unnecessarily high proportion of false alarms leads to unnecessary and excessive delays entailing considerable expense. It is highly desirable to reduce the number of false alarms while maintaining a sufficient margin of safety in the giving of alarms.

A prime factor in the high incidence of false alarms is the difficulty in determining whether the journals scanned are of the so-called solid-bearing or roller-bearing type. Roller bearings consistently run at higher temperatures, or are detected as running at higher temperatures, than solid bearings. Thus, the alarm system must distinguish whether a particular excessive temperature is due to a bad solid bearing, or to a normal roller bearing.

Another substantial factor in the high incidence of false alarms is error introduced in the detector and alarm systems themselves. Such errors may be caused by noise or by time displacement between temperature indicating signals that are to be compared to determine if a journal temperature is excessive compared to a reference temperature. The reference temperature may be that of a portion of the railroad car subject to the same ambient conditions as the journal being scanned, but more often it is the temperature of the journal on the opposite side of the same axle. In either case, the temperature indicating signals are compared to obtain the difference therebetween as one step in determining whether an overheated journal exists. If the signals to be compared are displaced in time it is apparent that the result of the comparison is not a true indication of relative temperature and will probably cause a false alarm to be given.

SUMMARY OF THE INVENTION

A general object of this invention is to provide a method and apparatus for detecting and indicating hot journals that overcomes the disadvantages noted above encountered in using prior such apparatus. A particular object is to provide such a method and apparatus that substantially reduces the number of false alarms given.

Another object is to provide a hot box alarm system that includes means for distinguishing between roller-bearing journals and solid-bearing journals and that prevents the giving of an alarm if roller bearings operating at their normal temperature are detected.

Another object is to provide such a system that will give an alarm if an overheated roller bearing is detected.

Yet another object of the invention is to provide a hot box alarm system that substantially eliminates false alarms due to factors that originate in the detector and alarm systems such as noise and time displacement between temperature indicating signals.

Still another object is to provide hot box alarm apparatus that may be used in conjunction with a conventional chart recorder to provide both temporary and permanent indication of the hot journals detected.

One aspect of this invention relates to a hot box alarm method and apparatus that distinguishes between overheated solid bearings and normally operating roller bearings and prevents the giving of an alarm when a normally operating roller-bearing journal is encountered.

This aspect of the invention is achieved by obtaining the temperatures of the journals on the two ends of an axle, and obtaining a quantity indicative of the difference between the temperatures. This difference is then compared with a predetermined difference to provide an output alarm when the magnitude of the difference exceeds the predetermined difference. The temperature of each of the journals is also compared individually to a predetermined reference to prevent the giving of the output alarm if both temperatures exceed the predetermined reference.

This aspect of the invention recognizes that normally operating roller bearings normally run hotter than solid bearings and may be expected to have a greater permissible difference in temperature between the roller-bearing journals on opposite ends of the same axle. Thus, even though the difference in temperature would be excessive for solid bearings, if the journals at both ends of the axle are detected as running substantially hotter than solid bearings it may be assumed that normally operating roller bearings have been detected and that no alarm should be given.

Further, the temperatures of each of the journals may be compared to a second predetermined reference larger than the first predetermined reference and an output alarm provided when either of the temperatures exceeds the second predetermined reference. This allows even overheated roller bearings to be detected.

Another aspect of the invention relates to the preventing of false alarms due to noise or to time displacement between temperature indicating signals. This aspect of the invention is achieved by producing electrical signals indicative of the temperatures of a journal and of a reference object, which may be the journal on the opposite end of the same axle, and comparing the signals to produce a signal indicative of the difference in amplitude between the temperature indicating signals. The difference signal is compared to the predetermined difference signal to produce an output alarm when the difference signal exceeds the predetermined difference signal. Duration of the difference signal is checked and the giving of an output alarm is prevented unless the duration of the difference signal is greater than the maximum time displacement that is likely to occur between the temperature indicating signals. This ensures that the alarm is not the result of noise or of an erroneous comparison due to time displacement between the temperature indicating signals.

The aspect of the invention recognizes that noise signals are commonly of very short duration and also that time displacement between temperature indicating signals can be determined with substantial reliability. If the difference signal is of very short duration then it is probably the result of a noise signal or of one temperature indicating signal being compared to the absence of the other temperature indicating signal which, in either case, would produce a false alarm.

BRIEF DESCRIPTION OF THE DRAWINGS

FIG. 1 is a perspective view of a railroad car on a track illustrating a typical arrangement of sensors in a hot box detector system for detecting overheated journals on both sides of the car.

FIG. 2 is a block diagram of a typical and illustrative hot box detector system for producing and transmitting temperature indicating signals to a hot box alarm system and to a graphic recorder associated therewith.

FIG. 3 is a block diagram of the hot box alarm apparatus of this invention connected to output devices for supplying alarm indications thereto.

FIG. 4 is a detailed schematic diagram of the hot box alarm apparatus of this invention connected to output devices.

FIG. 5 is a diagram illustrating the manner in which time displacement between temperature indicating signals from a hot box detector system can produce false alarms.

DESCRIPTION OF THE PREFERRED EMBODIMENTS

Referring to the drawings, FIG. 1 illustrates a typical physical arrangement of sensors 10 and 12 positioned on opposite sides of a given section of longitudinally extending track comprising rails 14 and 15 to scan the journal boxes 16 on both sides of an approaching railroad car 18. Wheel trips, one of which is indicated at 19, conventionally are located with respect to the sensors 10 and 12 to operate gating means and assure that the sensors produce signals that indicate the temperatures of journal boxes only and not of extraneous heat producing objects. Various arrangements of sensors and wheel trips in hot box detector systems are known other than as specifically illustrated in FIG. 1.

FIG. 2 is a block diagram of a typical illustrative hot box detector system for supplying temperature indicating signals to the hot box alarm system of this invention and to a recorder associated therewith. The signals from sensors 10 and 12 are connected to amplifiers 22, 23 to be shaped and amplified. The signals from the amplifiers are directed to gates 24 and 25 which are enabled by signals in line 26 from the wheel trip circuit 19'. The gating arrangement ensures that the heat indicating signals from sensors 10 and 12 represent the temperatures of journal boxes and not of an unintended target.

The outputs of gates 24 and 25 are connected to a transmitter 28. These signals modulate carrier signals and are transmitted to a more or less remote station where they are demodulated by receiver 30 and transmitted as signals A and B to a graphic recorder 32 such as a chart recorder and to a hot box alarm system 33.

Typically, the wheel trip circuit 19' also produces a signal in line 34 which indicates that a train has been detected in the monitoring area. One use of this signal is to condition equipment such as a recorder to handle subsequent heat indicating signals as will be explained more fully below. This signal is transmitted to recorder 32 in the same way as the temperature indicating signals A and B but prior thereto.

Many variations of the typical system shown in FIG. 2 may be employed. In some applications, for example, the transmitter 28 and receiver 30 are not necessary and the temperature indicating and wheel trip circuit signals are transmitted directly to the recorder and alarm system. The temperature indicating signals received by the recorder and by the hot box alarm system are usually pulses having amplitudes proportional to the temperatures of scanned journal boxes on opposite sides of the same axle. The detector system can be arranged, however, so that the output signal from sensor 10, for example, will represent the temperature of a scanned journal box while the output signal from sensor 12 will represent the temperature of a reference object on the railroad car that is subject to the same ambient conditions as the scanned journal box. In either case, temperature indicating signals can be recorded by chart recorder 32 and differentially evaluated in the hot box alarm system 33.

The typical detector and alarm system as illustrated in FIG. 2 has been prone to produce excessive numbers of false alarms resulting in a great deal of train delay for physical inspection of the supposed hot boxes. As discussed above, one source of false alarms is the difficulty in distinguishing an overheated solid-bearing journal from a normally operating roller-bearing journal. Many false alarms are given for normally operating roller-bearing journals.

Another source of false alarms is noise in the detector and alarm systems which may produce a false alarm. A somewhat similar source of false alarms is caused by time displacement, sometimes called signal skew, between temperature indicating signals transmitted to the hot box alarm system to be differentially compared. Physical skew of car axles with respect to the track is one source of such time displacement. Another source of time displacement is the detector equipment itself which may delay one temperature indicating signal more than another, for example, in the transmitter, resulting in time displacement between the temperature indicating signals when they are differentially evaluated.

Both of these sources of false alarms, signal skew and normally operating roller bearings, are handled in the improved alarm system of this invention 50 as to substantially reduce the number of false alarms and attendant disadvantages.

FIG. 3 is a block diagram of the improved hot box alarm system according to this invention. The alarm system may be used to particular advantage in conjunction with a chart recorder which, among other uses, may be used to establish initial conditions in the alarm system. As mentioned above, temperature indicating signals A and B are entered into chart recorder 32 to be recorded thereon. Desirably, chart drive of the recorder is initiated when a train is detected in the hot box detector area. One way of accomplishing this is by use of the wheel trip signal in line 34 (FIG. 2) as described above. The wheel trip signal in line 34 is transmitted to the chart recorder to initiate the chart drive which prepares the recorder to record the temperature indicating signals from the detecting equipment.

The wheel trip signal is also employed to initiate a signal from the chart recorder to enable an output circuit 36 of the alarm system through a delayed-start circuit 37. Until the output circuit 36 is enabled the alarm system is inactive and no alarm signal can be given for external use by a remote alarm user 38 or by the audio alarm 39. The delayed start circuit 37 prevents the giving of false alarms due to noise that occurs when the chart drive of the recorder is started. Output circuit 36 provides alarm indicating signals which may be used as event markers on the chart recorder to call the attention of the operator to a particular set of temperature indicating signals that were determined by the alarm system to be out of limits and to indicate a hot box.

After initial conditions are established in the alarm system as discussed above, temperature indicating signals A and B from the detector system are entered into the alarm system and simultaneously into difference amplifier 40, roller bearing check circuit 42 and maximum comparator 44. In difference amplifier 40 the signals A and B are subtracted and a signal obtained proportional to the difference therebetween which is entered into difference comparator 45 where the difference signal is compared to a signal representing a predetermined difference in the detected temperatures. If the difference signal exceeds the predetermined difference signal an output signal is produced to ultimately indicate that a hot box has been detected, unless the input signals are determined to represent the temperatures of normally operating roller bearings as discussed below.

In roller bearing cancellation circuit 42 the temperature indicating signals A and B are compared individually to a reference signal representing a temperature above the range of temperatures in which solid bearings normally operate. If both temperature indicating signals exceed the reference signal, indicating that the temperatures of the journal boxes on opposite sides of the same axle are both above the temperature at which solid bearings normally operate, it may be concluded with substantial reliability that roller-bearing journals have been scanned. In that case a signal is produced and entered into differential comparator 45 to prevent the giving of an output alarm signal therefrom.

The temperature indicating signals A and B are also entered into maximum comparator 44 where each signal is compared to a reference signal representing a temperature above which both roller bearings and solid bearings are considered to be overheated. If either of the temperature indicating signals exceeds the reference signal an output alarm signal is produced.

The inputs to OR gate 47 thus represent either an overheated solid bearing (but not a normally operating roller bearing) or an overheated roller bearing. The output of OR gate 47 is entered into noise and signal skew check circuit 49 where the duration of the alarm signal, which should be no less than that of the temperature indicating signals, is compared to a time interval representing the maximum time displacement or skew that is likely to occur between temperature indicating signals A and B. If the duration of the alarm signal is greater than the reference time interval an output from check circuit 49 is produced and entered into output circuit 36. The output circuit 36 conditions the alarm signal and transmits it to one or more circuits including the remote alarm user 38. The audio alarm 39 and the chart recorder 32, assuming that output circuit 36 has been enabled by a signal from chart recorder 32 as described above.

Referring now to FIG. 4 and initially to the right hand portion thereof, the output circuit includes controlled rectifiers 51 and 52 connected in series. The gate of controlled rectifier 51 is connected to receive a signal from the alarm system as will be described below. The gate of controlled rectifier 52 is connected to the output terminal of a delay circuit including unijunction transistor 54, resistor 55 and capacitor 56. The input to the delay circuit and to the anode of controlled rectifier 52 is a voltage level signal from the chart drive unit 57 of chart recorder 32. Controlled rectifier 52 is rendered conductive and establishes a path for controlled rectifier 51 to conduct and activate alarm devices when an alarm signal is received. The unijunction transistor circuit produces a delay according to the RC time constant of resistor 55 and capacitor 56 before producing an output signal at terminal 53 which is coupled to the gate of controlled rectifier 52 to trigger it on. The delay circuit serves to prevent the giving of false alarms due to noise generated by the recorder when chart drive is initiated. At this point, the alarm system is enabled to produce output alarm indications to various pieces of equipment as signals are received indicating that hot boxes have been detected.

Referring now to the left hand portion of FIG. 4 the temperature indicating signals A and B are passed through voltage dividers consisting of resistors 65 and 66 for signal A and resistors 67 and 68 for signal B. Signals A and B are entered into inputs 70 and 71 respectively of a differential amplifier 73 where signal B is subtracted from signal A. The output signal from amplifier 73 may be either positive or negative depending on whether signal A or signal B is larger in magnitude. For conformity with subsequent circuitry the difference signal is, if not already of positive polarity, converted thereto by passing through inverter amplifier 75. Diodes 77 and 78 are connected to the outputs of difference amplifier 73 and inverter amplifier 75, respectively, and pass a difference signal of positive polarity from the output of one or the other amplifier to input 80 of a comparator amplifier 82.

The remaining input 83 of amplifier 82 is connected to a reference signal representing a predetermined difference in temperature between journal boxes on the opposite ends of an axle. Amplifier 82 is effectively an open loop operational amplifier and, therefore, has very high gain. It assumes one or the other of two stable states according to whether the difference signal at input 80 is greater or less than the predetermined difference signal from signal source 84. Amplifier 82 assumes its most positive state indicating a hot box when the difference signal at input 80 exceeds the predetermined difference signal from source 84. The magnitude of the predetermined difference signal is increased to prevent the giving of an alarm signal under conditions to be described below.

Temperature indicating signals A and B are also entered into comparator amplifiers 87 and 88 which are of the same type as amplifier 82. Each temperature indicating signal is compared to a reference signal from signal source 90 representing a temperature above the range in which solid bearings normally operate. The outputs of amplifiers 87 and 88 are connected to diodes 92 and 93 which form an AND gate having its output connected to predetermined difference signal source 84. If both temperature indicating signals A and B exceed the reference signals from signal source 90 the outputs of both amplifiers 87 and 88 assume their most positive state and, in effect, pass a signal through diodes 92 and 93 to increase the value of the predetermined difference signal from source 84. In that case, the temperature difference signal at input 80 of amplifier 82 will not exceed the predetermined difference signal from source 84 and no output alarm signal will appear at the output of amplifier 82. Thus, the output alarm signal has been cancelled because of the discovery that the bearings on opposite ends of the same axle are both operating at temperatures in excess of normally operating solid bearings and are probably normally operating roller bearings.

The temperature indicating signals are also evaluated in the maximum comparator 44 (FIG. 3) substantially simultaneously with their differential evaluation. For this purpose temperature indicating signals A and B are passed through diodes 95 and 96 to one input of a comparator amplifier 98 which is of the same type as amplifiers 82, 87 and 88. The remaining input to amplifier 98 is connected to a reference signal from signal source 100 representing a temperature above which both roller bearings and solid bearings are considered to be overheated. If either temperature indicating signal A or B exceeds the reference signal from source 100 an output signal is produced from amplifier 98 indicating that a hot box has been detected, regardless of whether or not a roller bearing cancellation signal has been produced.

It should be noted that reference signal sources 84, 90 and 100 are variable. Each of the signal sources may be set to represent different temperatures according to variable factors such as ambient temperature at different seasons of the year and according to the experience and judgment of operating personnel as to precisely what constitutes a hot box.

The outputs of amplifiers 82 and 98 are connected to the inputs of an OR gate comprising diodes 102 and 103. The common output of the diodes 102 and 103 is connected to the input of the noise and signal skew check circuit.

Before describing the noise and signal skew check circuit and its operation reference is made to FIG. 5 for an illustrative example of how time displacement between temperature indicating signals A and B may produce a false alarm. In FIG. 5 waveform 105 represents a typical temperature indicating signal A, 106 represents a typical temperature indicating signal B and 107 represents the difference in amplitude between signals A and B which would appear at input 80 of amplifier 82. Reference numeral 108 represents the output alarm signal from amplifier 82 which is of the same width as difference signal 107 but is of a standard amplitude. The waveforms 105', 106', 107', and 108' correspond to the signals 105, 106, 107 and 108, respectively, with the exception that the signals 105' and 106' are displaced in time with the results shown, while the signals 105 and 106 are coincident in time.

As can be seen from FIG. 5, there is a substantial difference in amplitude between signals 105 and 106 as shown by the amplitude of signal 107. Assuming that difference signal 107 is greater than the predetermined difference signal from source 84 the alarm signal 108 will appear at the output of amplifier 82 unless cancelled by the roller bearing check circuit. In this case, a true alarm will be initiated.

Temperature indicating signals 105' and 106', on the other hand, are substantially the same in amplitude so that difference signal 107' should be of very small amplitude and insufficient to produce an alarm signal from the output of amplifier 82. Because of the time displacement between signals 105' and 106', however, it will be seen that the signals are not properly compared and that signal 107' has a leading signal peak of substantially the same amplitude as signal 105' and a trailing signal peak of substantially the same amplitude as signal 106'. Signal 108' which will appear at the output of amplifier 82 has the same appearance but is of the same standard amplitude as signal 108. Thus, it can be seen that, absent the noise and signal skew check circuit 49, a false alarm indication will be produced by signal 108'. Noise and signal skew check circuit 49, however, prevents the giving of such an alarm as described below.

Referring again to FIG. 4 the noise and signal skew check circuit comprises a unijunction oscillator including unijunction transistor 110, resistor 112 and capacitor 113. If allowed to free run the oscillator will produce output signals at terminal 115 at intervals dependent upon the value of resistor 112 and capacitor 113 in a manner well known in the art. Capacitor 113 is charged through resistor 112 until the voltage on the capacitor is sufficient to cause unijunction transistor 110 to "fire" and produce an output pulse at terminal 115. Capacitor 113 is shunted by transistor 117 which is maintained normally conducting by input transistor 119. Transistor 119 is non-conducting until an output alarm signal is received through diode 102 or 103.

Terminal 115 is connected to the input of a monostable multivibrator including transistors 121 and 122. The monostable multivibrator, upon receiving an appropriate input pulse, will produce an output pulse from terminal 124 having a predetermined duration according to the time constant of the particular circuit as is well known in the art.

In operation, a true output alarm signal such as signal 108 (FIG. 5) will have a known, substantially constant duration. When the alarm signal appears at the input of the noise and signal skew check circuit it will render transistor 119 conductive which will in turn render transistor 117 nonconductive. Capacitor 113 thereupon begins to charge through resistor 112 and will continue to do so until the firing voltage of unijunction transistor 110 is reached or until transistor 117 is again rendered conductive by the removal of the alarm signal and discharges capacitor 113. The values of resistor 112 and capacitor 113 are selected so that the time required for capacitor 113 to charge sufficiently to cause a pulse to be produced at terminal 115 is slightly greater than the estimated maximum skew or time displacement that will occur between input signals 105' and 106' (FIG. 5).

Thus, if the width of the peaks of signal 108' in FIG. 5 represents the estimated maximum time displacement between signals 105' and 106' any alarm signal wider than those peaks is a true alarm signal and will be of sufficient duration to allow a pulse to be produced at terminal 115. A false alarm signal such as 108', however, will be of insufficient duration to allow a signal to be produced at terminal 115 and no false alarm will be given.

It should be noted that the same result will occur for noise pulses, which are usually of relatively short duration. Thus, the noise and signal skew check circuit prevents the giving of false alarms due to noise or to time displacement between temperature indicating signals.

A pulse from terminal 115 of the noise and signal skew check circuit is coupled to the gate of controlled rectifier 51 and renders it conductive, assuming that controlled rectifier 52 in series with controlled rectifier 51 has been rendered conductive as described above.

With both controlled rectifiers 51 and 52 conducting, a light 140 is turned on to indicate that a hot box has been detected. A relay 141 is also actuated and through its contacts 141a, 141b, 141c may provide a signal to a remote location such as to a remote dispatcher as indicated at 143 to indicate that a hot box has been detected on an incoming train. An audio alarm 39 is also activated to give an audible warning to personnel that a hot box has been detected.

In addition to the signal at terminal 115 of the noise and signal skew check circuit a pulse of predetermined duration is produced at terminal 124 and is coupled to the base of a transistor 150 that is connected in series with a relay coil 152. Transistor 150 is rendered conductive for the duration of the pulse and actuates relay 152. Contacts 152a, 152b and 152c of relay 152 are connected to the recorder pen control circuit 154 to provide an event mark on the chart 155 adjacent the temperature indicating signals from the particular journal box detected as being overheated.

The alarm circuit may be turned off by momentarily depressing manual switch 160 which shunts controlled rectifiers 51 and 52 and renders them nonconductive turning off light 140, audio alarm 144 and relay 141.

In operation, the alarm system is enabled and chart drive of the recorder 32 is initiated when a train is detected in the operating zone of the detector system as described above. A short time later sets of temperature indicating signals A and B for each axle of the train are received by the recorder and the alarm system as they are produced by the detector system. Each set of temperature indicating signals is differentially evaluated and is evaluated in the maximum comparator to determine if it indicates an overheated journal. Each set of signals is also evaluated in the roller bearing cancellation circuit and the alarm signal from the differential evaluation is cancelled if the signals are determined to represent the temperatures of roller-bearing journals.

If an alarm signal is produced at the input of the noise and signal skew check circuit its duration is checked as described above. If the alarm signal is determined to be a true alarm signal and not the result of noise or signal skew the various alarm indicators are activated and an event mark is recorded on the chart recorder. The alarm devices provide a temporary indication of a hot box while the event mark adjacent the temperature indicating signals on the chart recorder provides a permanent indication thereof.

While there has been shown and described a preferred embodiment of this invention, changes and improvements will occur to those who come to understand its essential principles and accomplishments. This invention, therefore, is not to be limited to the specific form and embodiment herein shown and described nor in any other way inconsistent with the progress in the art promoted thereby.

I claim:

1. A system for evaluating a pair of input signals having amplitudes indicative of the temperatures of journals on opposite ends of a railroad car axle and producing an overheated journal alarm therefrom comprising, means for obtaining a signal representing the difference in amplitude between said input signals, a comparator for comparing said difference signal to a reference signal representing a predetermined difference in temperature between said journals and for providing an output alarm signal when said difference signal is greater than said predetermined difference signal, and an output alarm signal cancellation circuit including means for comparing the amplitude of each of said input signals to a first reference signal representing a first predetermined temperature of said journals and for preventing the giving of said output alarm signal from said comparator when the amplitudes of both of said signals exceed said first reference signal.

2. The system as claimed in claim 1 wherein said first reference signal represents a temperature above the range of temperatures in which solid bearings normally operate whereby said output alarm signal is cancelled when both said temperature indicating signals are determined to represent temperatures above those at which solid bearings normally operate.

3. The system as claimed in claim 1 further comprising means for comparing each of said input signals to a second reference signal representing a second predetermined temperature of said journals higher than said first temperature and for providing an output alarm signal when the amplitude of either of said input signals exceeds said second reference signal.

4. The system as claimed in claim 3 wherein said second reference signal represents a temperature above which both roller bearings and solid bearings are considered to be overheated.

5. The system as claimed in claim 1 wherein said output alarm signal cancellation circuit comprises first and second comparators for comparing said input signals to said first reference signal, gate means connected to the outputs of said first and second comparators for producing a cancellation signal when both said input signals exceed said first reference signal, and means for utilizing said cancellation signal to cancel said output alarm signal.

6. The system as claimed in claim 5 wherein said means for utilizing said cancellation signal to cancel said output alarm signal includes means for combining said cancellation signal with said predetermined difference signal to render said predetermined difference signal larger than said difference signal, whereby said output alarm signal is cancelled.

7. The system as claimed in claim 1 further comprising a graphic recorder that receives and records said input signals, and means for conveying said output alarm signal to said recorder to provide an event mark thereon indicating input signals that represent an overheated journal.

8. The system as claimed in claim 1 including audio alarm means activated by said output alarm signal.

9. The system as claimed in claim 1 further comprising circuit means responsive to the time duration of said difference signal for cancelling said output alarm signal when it was produced by a noise pulse or by time displacement between said input signals.

10. The system as claimed in claim 9 wherein said circuit means includes a circuit for comparing the duration of said difference signal to a time interval representing the maximum time displacement that is likely to occur between said input signals and for preventing the giving of said output alarm signal unless the duration of said difference signal is greater than said time interval.

11. An alarm system for receiving input signals from a hot box detector system and producing temporary and permanent indications of overheated journals therefrom, said signals including a pair having amplitudes indicative of the temperatures of journals on opposite ends of a railroad car axle and a signal indicating the presence of journals to be monitored comprising, means for obtaining a signal representing the difference in amplitude between said pair of input signals, a comparator for comparing said difference signal to a reference signal representing a predetermined difference in temperature between said journals and for providing an output alarm signal when said difference signal is greater than said predetermined difference signal, an output alarm signal cancellation circuit including means for comparing the amplitude of each of said pair of input signals to a first reference signal representing a first predetermined temperature of said journals and for cancelling said output alarm signal from said comparator when the amplitude of each of said pair of input signals exceeds said first reference signal, means for comparing each of said pair of input signals to a second reference signal greater than said first reference signal and for producing an output alarm signal when the amplitude of either of said pair of input signals exceeds said second reference signal, a graphic recorder for receiving and recording said pair of input signals, and means for conveying said output alarm signal to said recorder to provide an event mark thereon indicating a pair of signals that represent an overheated journal.

12. The system as claimed in claim 11 wherein said recorder is a chart recorder and drive for said chart is initiated by said signal indicating the presence of journals to be monitored, and further comprising switch means responsive to the initiation of chart drive of said recorder for providing a signal to enable said output alarm signal to be conveyed to said chart recorder to provide an event mark thereon.

13. The system as claimed in claim 12 further comprising delay circuit means for delaying said enabling signal to prevent noise signals generated by the start of chart movement from producing a false output alarm signal.

14. A method for detecting and indicating overheated journals on the axles of railroad cars without giving false indications thereof comprising the steps of, obtaining the temperatures of the journals on the two ends of an axle, obtaining a quantity indicative of the difference between the temperatures, comparing the difference with a predetermined difference to provide an output alarm indication when the magnitude of said difference exceeds said predetermined difference, and comparing each of said temperatures to a first predetermined reference to prevent the giving of said output alarm indication when both said temperatures exceed the first predetermined reference.

15. The method as claimed in claim 14 including the step of comparing each of said temperatures to a second predetermined reference larger than said first predetermined reference to provide an output alarm indication when either of said temperatures exceeds the second predetermined reference, regardless of whether said temperatures exceed said first predetermined reference.

16. The method as claimed in claim 14 wherein said temperatures are obtained in the form of electrical temperature indicating signals and further comprising the steps of checking the duration of the difference indicating signal and preventing the giving of an output alarm indication unless the duration of the difference indicating signal is greater than a predetermined duration representing the maximum time displacement that is likely to occur between the temperature indicating signals.

17. A system for evaluating a pair of input signals having amplitudes indicative of the temperatures of journals on opposite sides of a railroad car axle and producing an overheated journal alarm therefrom comprising means for obtaining a signal representing the difference in amplitude between said input signals, a comparator for comparing said difference signal to a signal representing a predetermined difference in temperature between said journals and for producing an output alarm signal when said difference signal is greater than said predetermined difference signal, an output alarm signal cancellation circuit for comparing the amplitude of each of said input signals to a first reference signal representing a first predetermined temperature of said journals and for preventing the giving of an output alarm signal from said comparator when the amplitudes of both of said input signals exceeds said first reference signal, means for comparing the amplitude of each of said input signals to a second reference signal representing a second predetermined temperature greater than said first predetermined temperature and for providing an output alarm signal when either of said input signals exceeds said second reference signal, and means for comparing the duration of said output alarm signal to a predetermined time interval at least as great as the maximum time displacement that is likely to occur between said input signals and for preventing the giving of said output alarm signal unless the duration of said output alarm signal exceeds said time interval.

18. The system as claimed in claim 17 further comprising a graphic recorder that receives and records said input signals, and means for conveying said output alarm signal to said recorder to provide an event mark thereon indicating input signals that represent an overheated journal.

19. A method for detecting and indicating overheated journal on the axles of a railroad car without giving false indications thereof comprising the steps of obtaining electrical pulses having amplitudes indicative of the temperatures of the journals on the two ends of an axle, comparing the temperature pulses to obtain a pulse indicating the difference between said temperatures, comparing the difference pulse with a predetermined difference signal to provide an output alarm indication when said difference pulse exceeds said predetermined difference signal, comparing each of said temperature indicating pulses to a first predetermined reference signal to produce an indicating signal when both said temperature indicating pulses exceed said first predetermined reference signal, utilizing said indicating signal to prevent the giving of an output alarm indication, comparing each of said temperature indicating pulses to a second predetermined reference signal larger than said first predetermined reference signal to provide an output alarm indication regardless of the production of said indicating signal when either of said temperature indicating pulses exceeds the second predetermined reference signal, checking the duration of said difference indicating pulse, and preventing the giving of an output alarm indication unless the duration of said difference indication pulse is greater than a predetermined duration representing the maximum time displacement that is likely to occur between said temperature indicating pulses.

20. The method as claimed in claim 19 including the steps of recording said temperature indicating pulses and utilizing said output alarm indication to record an event mark indicating that said temperature indicating pulses represent an overheated journal.

21. A system for evaluating a pair of input signals having amplitudes indicative of the temperatures of a journal of a railroad car axle and of a reference object and producing an overheated journal alarm therefrom comprising means for obtaining a signal representing the difference in amplitude between said input signals, a comparator for comparing said difference signal to a reference signal representing a predetermined difference in temperature between said journal and said reference object and for providing an output alarm signal when said difference signal is greater than said predetermined difference signal, and a pulse width discriminator for checking the duration of said difference signal and for preventing the giving of an alarm signal unless the duration of said difference signal is greater than the maximum time displacement that is likely to occur between said input signals, said pulse width discriminator including a relaxation oscillator having a period between pulses at least as great as the maximum time displacement that is likely to occur between said input signals, and switch means maintaining said oscillator normally inoperative, said switch means allowing said oscillator to operate for the duration of said difference signal whereby an output alarm signal is produced or not by said oscillator according to whether the duration of said difference signal is greater or less than the period between pulses of said oscillator.

22. A system for evaluating a pair of input signals having amplitudes indicative of the temperatures of the journal of the railroad car axle and of a reference object and producing an overheated journal alarm therefrom comprising means for obtaining a signal representing the difference in amplitude between said input signals, a comparator for comparing said difference signal to a reference signal representing a predetermined difference in temperature between said journal and said reference object and for providing an output alarm signal when said difference signal is greater than said predetermined difference signal, RC circuit means for providing a delay interval at least as great as the maximum time displacement that is likely to occur between said input signals, and means for comparing said delay interval to the duration of said difference signal and for preventing the giving of an alarm signal unless the duration of said difference signal is greater than said delay interval.

* * * * *